(12) United States Patent
Le Chevalier

(10) Patent No.: US 7,908,344 B2
(45) Date of Patent: Mar. 15, 2011

(54) METHODS, APPARATUS, AND SYSTEMS FOR PROVIDING LOCAL AND ONLINE DATA SERVICES

(75) Inventor: Vincent Le Chevalier, San Jose, CA (US)

(73) Assignee: Skiff, LLC, New York, NY (US)

( * ) Notice: Subject to any disclaimer, the term of this patent is extended or adjusted under 35 U.S.C. 154(b) by 0 days.

(21) Appl. No.: 12/629,505

(22) Filed: Dec. 2, 2009

(65) Prior Publication Data
US 2010/0070576 A1 Mar. 18, 2010

Related U.S. Application Data

(63) Continuation of application No. 12/248,460, filed on Oct. 9, 2008.

(60) Provisional application No. 60/978,723, filed on Oct. 9, 2007.

(51) Int. Cl.
G06F 15/16 (2006.01)
G06F 17/00 (2006.01)

(52) U.S. Cl. ......... 709/218; 709/203; 709/217; 715/239

(58) Field of Classification Search .................. 709/203, 709/201, 217–219; 715/200, 201, 234, 239
See application file for complete search history.

(56) References Cited

U.S. PATENT DOCUMENTS

| | | | |
|---|---|---|---|
| 5,911,776 A * | 6/1999 | Guck | 709/217 |
| 6,249,794 B1 * | 6/2001 | Raman | 715/210 |
| 7,016,963 B1 * | 3/2006 | Judd et al. | 709/228 |
| 7,028,258 B1 | 4/2006 | Thacker et al. | |
| 7,085,755 B2 | 8/2006 | Bluhm et al. | |
| 7,107,317 B2 * | 9/2006 | Demsky et al. | 709/207 |
| 7,196,676 B2 | 3/2007 | Nakamura et al. | |
| 7,290,285 B2 | 10/2007 | McCurdy et al. | |
| 7,487,469 B2 * | 2/2009 | Toriyama et al. | 715/863 |
| 7,509,576 B2 * | 3/2009 | Kanai | 715/239 |
| 2002/0049777 A1 | 4/2002 | Terayama et al. | |
| 2002/0069420 A1 | 6/2002 | Russell et al. | |

(Continued)

FOREIGN PATENT DOCUMENTS

JP 2000293592 A 10/2000

(Continued)

OTHER PUBLICATIONS

Milic-Frayling, N. and Sommerer, R. "Smartview: Enhanced document viewer for mobile devices". Technical Report MSR-TR-2002-114, Microsoft Research, Cambridge, UK, Nov. 2002. [retrieved from Internet Mar. 24, 2010 "http://research.microsoft.com/pubs/69974/tr-2002-114.pdf"].*

(Continued)

Primary Examiner — Joseph Thomas
Assistant Examiner — Lashanya R Nash
(74) Attorney, Agent, or Firm — Hunton & Williams LLP

(57) ABSTRACT

A system and method for processing content data for one or more reader devices at a server in accordance with exemplary embodiments may include receiving, from one or more end-user devices, content data associated with one or more content resources via a first network, analyzing the content data using one or more online content analysis devices whereby analysis data is generated, formatting the content data using one or more online formatting devices based on the analysis data, and outputting, to the one or more the reader devices, formatted content data via a second network.

16 Claims, 6 Drawing Sheets

U.S. PATENT DOCUMENTS

| | | |
|---|---|---|
| 2002/0161476 A1 | 10/2002 | Panofsky et al. |
| 2002/0174145 A1 | 11/2002 | Duga et al. |
| 2004/0025111 A1 | 2/2004 | Park |
| 2004/0199876 A1 | 10/2004 | Ethier et al. |
| 2004/0205636 A1 | 10/2004 | Kasahara et al. |
| 2005/0022113 A1 | 1/2005 | Hanlon |
| 2005/0216492 A1 | 9/2005 | Singhal et al. |
| 2006/0010137 A1 | 1/2006 | Johnson |
| 2006/0031760 A1 | 2/2006 | Jacobs |
| 2006/0041840 A1* | 2/2006 | Blair et al. ............ 715/513 |
| 2006/0150096 A1 | 7/2006 | Thacker et al. |
| 2006/0230340 A1 | 10/2006 | Parsons et al. |
| 2007/0050340 A1 | 3/2007 | Von Kaenal et al. |
| 2007/0094583 A1 | 4/2007 | Randall et al. |
| 2007/0237401 A1 | 10/2007 | Coath et al. |
| 2008/0235563 A1 | 9/2008 | Nakamura |
| 2009/0172520 A1* | 7/2009 | Kim ..................... 715/234 |

FOREIGN PATENT DOCUMENTS

| | | |
|---|---|---|
| JP | 2005010830 A | 1/2005 |
| JP | 2005056039 A | 3/2005 |
| JP | 2006065759 A | 3/2006 |
| JP | 2006331094 A | 12/2006 |
| WO | WO 00/75803 A1 | 12/2000 |
| WO | WO 2004/086249 A1 | 10/2004 |

OTHER PUBLICATIONS

Weissberg, A. "The Identification of Digital Book Content"; Publishing Research Quarterly. vol. 24, No. 4, pp. 255-260, Mar. 2008. [retrieved from SpringerLink book database on Jan. 21, 2011].*
Notification of Transmittal of the International Search Report and the Written Opinion of the International Searching Authority, or the Declaration, dated Dec. 16, 2008.

* cited by examiner

METHODS, APPARATUS, AND SYSTEMS FOR PROVIDING LOCAL AND ONLINE DATA SERVICES

CROSS REFERENCE TO RELATED APPLICATIONS

This application is a continuation of U.S. application Ser. No. 12/248,460 filed Oct. 9, 2008 entitled "Methods And Apparatus For Local And On-line Data Services," which claims priority to Provisional U.S. Application Ser. No. 60/978,723 filed Oct. 9, 2007 entitled "Methods And Apparatus For Local And On-line Data Services," which is incorporated by reference herein in its entirety.

BACKGROUND INFORMATION

In general, full versions of software applications may be configured to independently operate (e.g., execute) on each end-user device (e.g., a personal computer, a laptop computer). During operation on the end-user device, these software applications may be limited by the amount of processing power and/or the amount of storage the end-user device has available. The advent of the Internet has provided a means by which end-user devices may seamlessly access software applications operating on remote servers.

SUMMARY OF THE INVENTION

Based on recent web technology and infrastructure, traditional local PC software (e.g., word processing and other Office-applications) have started to migrate to a new breed of on-line services and solutions. This virtualization of the PC software productivity environment, driven by the like of Google, Microsoft, and Adobe, for example, is offering to its users a future where most of content creation, editing and sharing will be done on servers far away from their personal computer, supported by large amounts of storage and processing power, while maximizing technical support and other IT issues that inevitably result from the deployment of complex software and applications. While initial online web and document services have been deployed so far with relative low success, as more and more applications are merging their local with online features, the virtualization of the PC software space is only going to accelerate. Data services, all focusing on delivering better reading platforms and environments, is particularly interested in offering to its subscribers a solution where their productivity and other personal contents can be best delivered and consumed on reader platforms.

Accordingly, at least one exemplary embodiment may provide a method for virtually processing content data for one or more reader devices at a server. This embodiment may include receiving, from one or more end-user devices, content data associated with one or more content resources via a first network, analyzing the content data using one or more online content analysis devices whereby analysis data is generated, formatting the content data using one or more online formatting devices based on the analysis data, and outputting, to the one or more the reader devices, formatted content data via a second network.

Another embodiment according to this invention may provide a system for virtually processing content data for one or more reader devices at a server. This embodiment may include an online content storage module configured to receive, from one or more end-user devices, content data associated with one or more content resources via a first network, an online content analysis module configured to analyze the content data using one or more online analysis devices whereby analysis data is generated, an online content format module configured to format the content data using one or more online formatting devices based on the analysis data, and an online content delivery module configured to output, to the one or more reader devices, formatted content data via a second network.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

Figure 1:
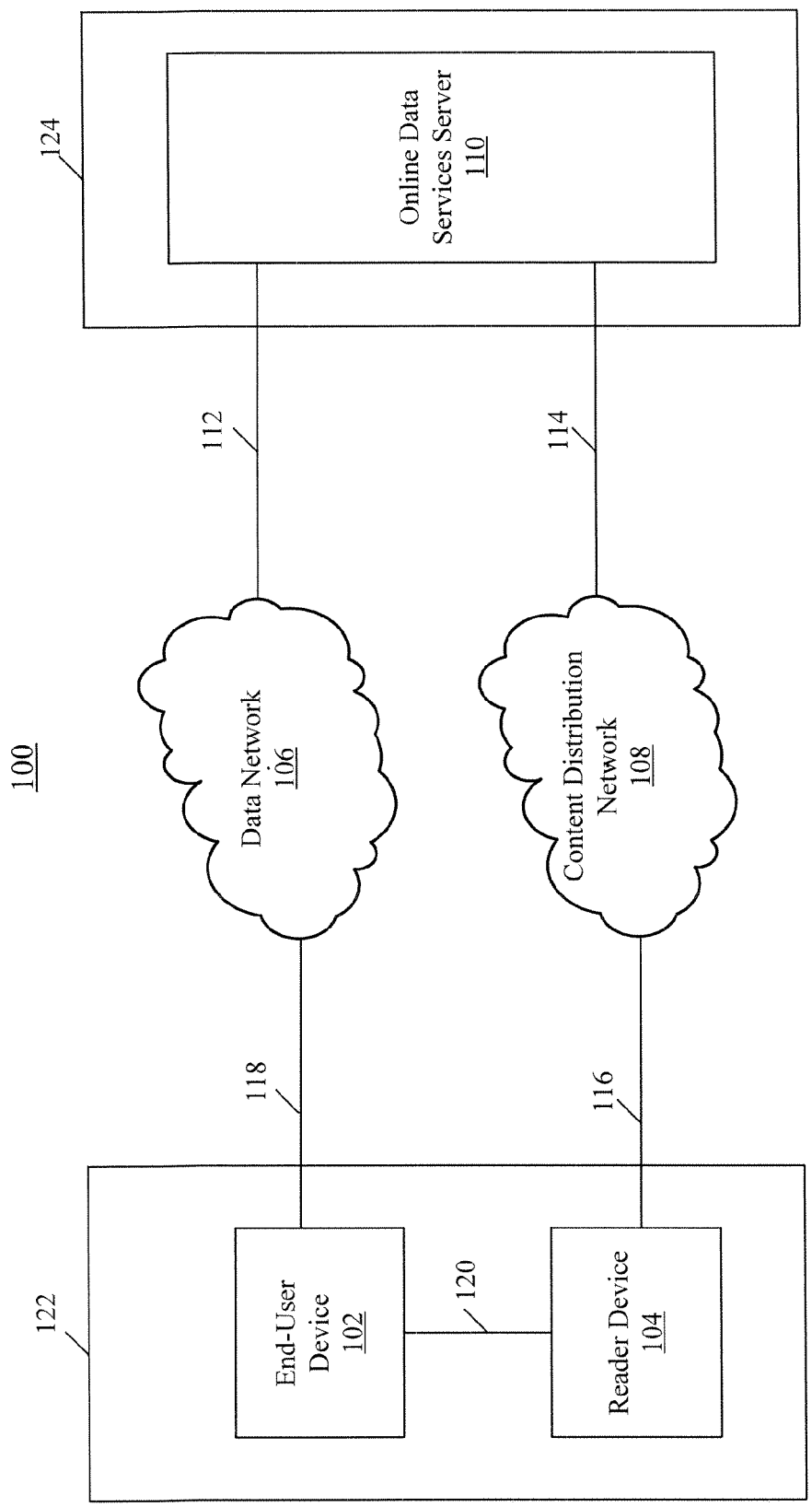
FIG. 1 illustrates a block diagram of a data services system in accordance with exemplary embodiments.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

The description below describes end-user devices, reader devices, and servers that may include one or more modules, some of which are explicitly shown in the figures, others that are not. As used herein, the term "module" may be understood to refer to computing software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., end-user devices, reader devices, servers, etc.) separately. The functions described as being performed at various components may be performed at other components, and the various components may be combined and/or separated. Other modifications also may be made.

Data services offer end-users a complete solution for carrying, archiving, and reading all their personal digital documents on electronic reader platforms, such as e-ink devices. This end-to-end system combines local processes with online services for extensive content conversion, management, personal storage, and delivery.

In an exemplary embodiment, a data services system may be configured to process content data for one or more reader devices locally at one or more end-user devices and/or remotely at an online data services server. In various embodiments, content data may include data generated by one or more content resources, such as, one or more one or more end-user device resources and/or one or more web publishing resources.

In various embodiments, an end-user device resource may include one or more software applications operating on one or more end-user devices. In such embodiments, content data generated by one or more end-user device resources may be in the form of an electronic file (e.g., an image electronic file, a Microsoft Excel Spreadsheet electronic file). For example, content data may include a Word document file generated by the Microsoft Word software application operating on the end-user device. In another example, content data may include a PowerPoint presentation file generated by the Microsoft PowerPoint software application operating on the end-user device. In yet another example, content data may include an image file generated by an image processing software application operating on the end-user device.

In various embodiments, a web publishing resource may include one or more websites that provide information via the internet. In such embodiments, content data generated by one or more web publishing resources may be in the form of a web document (e.g., HyperText Markup Language (HTML) web document, Extensible Markup Language (XML) web document). For example, content data may include a New York Times article in the form of an HTML web document generated by the New York Times website on the internet. In another example, content data may include a Wall Street Journal article in the form of a XML web document generated by the Wall Street Journal website on the internet. In yet another example, content data may include a blog posting in the form of an HTML web document generated by a blog website on the internet. In an additional example, content data may include a web feed (e.g., a news feed) in the form of an HTML web document generated by a web feed website on the internet.

In various embodiments, the data services system may be configured to process paginated content data or non-paginated content data. Paginated content data may include content that is organized into one or more pages using one or more layout mechanisms (e.g., a layout engine). For example, paginated content data may include content data that is organized to be printed out in one or more pages (e.g., 8.5×11 inch paper, 11×14 inch paper. Non-paginated content data may include content that is not organized into one or more pages. For example, non-paginated content data may include content data that is not organized to be printed out into pages (e.g., a web page, a text file). In various embodiments, one or more reader devices may be configured to decipher, process, and/or display paginated content data and/or non-paginated content data. In various embodiments, one or more online data services servers and/or one or more end-user devices may be configured to decipher, process, and/or display paginated content data and/or non-paginated content data.

In an exemplary embodiment, processing content data locally at an end-user device may include using local software and/or local hardware to analyze the content data and/or format the content data in preparation for display on a reader device. In such embodiments, locally analyzing the content data may include determining one or more characteristics of the content data using one or more local content analysis devices. In such embodiments, formatting the content data may include converting the content data from a format decipherable by the content resource that generated the content data to a format decipherable by one or more software applications operating on the reader device using one or more local content formatting devices. In various embodiments, after the content data has been processed (e.g., formatted), the end-user device may communicate the processed (e.g., formatted) content data to a reader device using one or more local communication mediums (e.g., a Universal Serial Bus (USB) port, a Local Area Network (LAN)).

In an exemplary embodiment, processing content data remotely at an online data services server may include the online data services server receiving the content data transmitted from an end-user device through a data network. After the content data has been received, the online data services server may process the content data using online software and/or online hardware to analyze the content data and/or format the content data in preparation for display on a reader device. In such embodiments, remotely analyzing the content data may include determining one or more characteristics of the content data using one or more online content analysis devices. In such embodiments, formatting the content data may include converting the content data from a format decipherable by the content resource that generated the content data to a format decipherable by one or more software applications operating on the reader device using one or more online content formatting devices. In various embodiments, after the content data has been processed (e.g., formatted), the online data services server may communicate the processed (e.g., formatted) content data to a reader device using one or more online communication mediums (e.g., a Content Distribution Network (CDN)).

FIG. 1 illustrates a block diagram of a data services system 100 in accordance with exemplary embodiments. The data services system 100 may include a downstream side 122 and an upstream side 124. In an exemplary embodiment, the downstream side 122 of the data services system 100 may include one or more end-user devices 102 and/or one or more reader devices 104. In an exemplary embodiment, the upstream side 124 of the data services system 100 may include one or more online data services servers 110.

The data services system 100 may be communicatively coupled to the data network 106. The data network 106 may include one or more of a local area networks (LANs), one or more wide area networks (WANs), the Internet, one or more cellular networks, one or more satellite networks, and/or any other networks that permit the transfer and/or reception of data. The data network 106 may utilize one or more protocols of network clients. The data network 106 may also translate to or from other protocols to one or more protocols of network clients. In exemplary embodiments, the data network 106 may include one or more of the exemplary networks recited above operating as a stand-alone network or in cooperation with each other. Use of the term network herein is not intended to limit the network to a single network.

The data services system 100 may be communicatively coupled to the content distribution network 108. Details of the functionality and operation of the content distribution network 108 are disclosed in the following documents: (1) Provisional U.S. Application Ser. No. 60/978,722 filed Oct. 9, 2007 entitled "Methods and Apparatus for a Content Distribution Network," for which the following U.S. patent applications claim priority, U.S. patent application Ser. No. 12/248,482 and U.S. patent application Ser. No. 12/248,331 (2) Provisional U.S. Application Ser. No. 60/978,748 filed Oct. 9, 2007 entitled "Content Distribution and Preloading," for which the following U.S. patent applications claim priority, U.S. patent application Ser. No. 12/248,482 and U.S. patent application Ser. No. 12/248,331. The Provisional Patent Applications mentioned are incorporated by reference herein in their entirety.

In an exemplary embodiment, end-user device 102 and online data services server 110 may be communicatively coupled and/or have access to one or more data networks 106. For example, end-user device 102 and online data services server 110 may communicate with each other using one or more data networks 106.

End-user device 102 may include, but is not limited to, a computer device or communications device including, e.g., a personal computer (PC), a workstation, a mobile device, a handheld PC, a personal digital assistant (PDA), a thin system, a fat system, a network appliance, an Internet browser, a server, a lap top device, and/or any other device that is configured to retrieve, generate and/or transmit content data signals to the online data services server 110 using data network 106 and/or generate and/or transmit formatted content data signals to the reader device 104 using data path 120. Content data signals may include content data retrieved and/or generated by one or more content resources accessible by the end-user device 102. For example, content data signals may include video signals and/or audio signals, text data, other digital information, and/or combinations thereof. Formatted content data signals may include content data that has been processed (e.g., formatted) using one or more content analysis devices and/or one or more content formatting devices. For example, formatted content data signals may be used to display content using a display module associated with the reader device 104. In various embodiments, content may include video information, audio information, text information, and/or other types of visual or audible information.

End-user device 102 may be configured to determine whether to process content data locally using one or more of the end-user device's 102 processing capabilities or transmit the content data to the online data services server 110 for online processing (e.g., remote processing). In an exemplary embodiment, determining whether to process the content data locally or remotely may include the end-user device 102 assessing one or more local factors associated with the end-user device 102. Assessing one or more local factors associated with the end-user device 102 may include assessing the end-user device's 102 available processing resources (e.g., amount of battery power, amount of bandwidth), the user's experience with the reader device 104 (e.g., decreased processing speed), the type of content data, and/or any other local factor that may be used to determine whether the content data is processed locally or remotely. For example, determining whether to process content data locally or remotely may include the end-user device 102 assessing the amount of bandwidth that is available to the end-user device 102. In another example, determining whether to process content data locally or remotely may include the end-user device 102 assessing the amount of battery power available to the end-user device 102. In yet another example, determining whether to process content data locally or remotely may include the end-user device 102 assessing how much processing the content data locally will effect the user's experience with the reader device 104 (e.g., increased wait time).

In an exemplary embodiment, determining whether to process the content data locally or remotely may include the end-user device 102 assessing one or more online factors associated with the online data services server 110. Assessing one or more online factors associated with the online data services server 110 may include assessing online data services server's 110 available processing resources (e.g., server load, amount of bandwidth), the type of content data, and/or any other online factor that may be used to determine whether the content data is processed locally or remotely.

If, for example, the end-user device 102 determines to process the content data remotely, the end-user device 102 may transmit the content data to the online data services server 110 using data path 118 to data network 106. If, however, the end-user device 102 determines to process the content data locally, the end-user device 102 may process the content data using one or more local content analysis devices and/or one or more local content formatting devices. In an exemplary embodiment, the end-user device 102 may transmit the processed content data (e.g., formatted content data) to the reader device 104 using data path 120.

In an exemplary embodiment, the online data services server 110 may be configured to receive content data associated with a particular end-user (or end-user device 102) from the data network 106. For example, the online data services server 110 may receive one or more content data signals from the data network 106 via data path 112.

In an exemplary embodiment, the online data services server 110 may be configured to process the content data using one or more online content analysis devices and/or one or more online content formatting devices. In an exemplary embodiment, the online data services server 110 may transmit the processed content data (e.g., formatted content data) to the reader device 104 using the content distribution network 108. More specifically, the online data services server 110 may transmit the formatted content data to the reader device 104 using data path 114.

The reader device 104 may be configured to receive formatted content data from the end-user device 102 and/or the online data services server 110. For example, the reader device 104 may receive formatted content data from the end-user device 120 via data path 120. In another example, the reader device 104 may receive formatted content data from the online data services server 110 via data path 116.

In an exemplary embodiment, the reader device 104 may include hardware and/or software configured to output (e.g., display) the formatted content data to a user using one or more output modules (e.g., display modules). Details of the functionality and operation of the reader device 104 are disclosed in Provisional U.S. Application Ser. No. 60/978,717 filed Oct. 9, 2007 entitled "Foldable Media Device," for which the following U.S. patent application claims priority, U.S. patent application Ser. No. 12/248,331. The Provisional Patent Application mentioned is incorporated by reference herein in its entirety.

It is noted that the data services system 100 illustrates a simplified view of various components included in a data services system, and that other hardware devices and software not depicted may be included in the data services system 100. It is also noted that the data services system 100 illustrates only a single end-user device 102, a single reader device 104, and a single online data services server 110. It will be appreciated that multiple instances of these devices may be used. The end-user device 102 and the online data services server 110 are discussed in further detail below.

Figure 2:
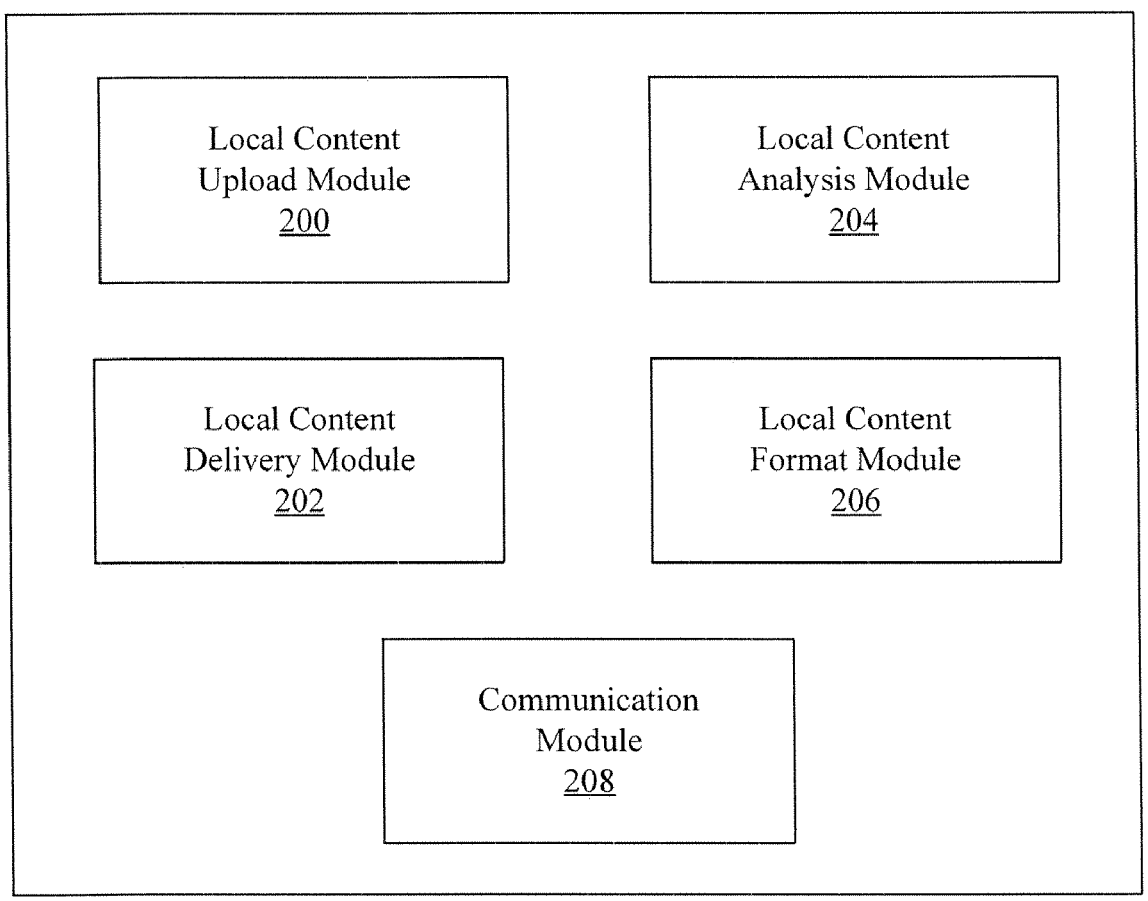
FIG. 2 illustrates exemplary modules of an end-user device in accordance with exemplary embodiments.

FIG. 2 illustrates exemplary modules of the end-user device 102 in accordance with exemplary embodiments. In an exemplary embodiment, the end-user device 102 may include a local content upload module 200, a local content delivery module 202, a local content analysis module 204, a local content format module 206, and a communication module 208. It is noted that the modules 200, 202, 204, 206, and 208 are exemplary. The functions of the modules 200, 202, 204, 206, and 208 may be performed at other modules remote or local to the end-user device 102, and the modules 200, 202, 204, 206, and 208 may be combined and/or separated.

The local content upload module 200 may include software and/or hardware configured to retrieve and/or receive content data generated by one or more content resources accessible by the end-user device 102. For example, the local content upload module 200 may retrieve and/or receive content data, such as, an electronic file (e.g., a Microsoft Word document) generated by the Microsoft Word software application operating on the end-user device 102. In another example, the local content upload module 200 may retrieve and/or receive content data, such as, a web document (e.g., a New York Times article HTML web document) generated by the New York Times website on the internet. In various embodiments, the local content upload module 200 may be configured to retrieve/receive content data from a particular storage location (e.g., a local working directory) associated with the data services system 100 located in the end-user device 102.

The local content upload module 200 may also include software and/or hardware configured to determine whether to process the content data locally or transmit the content data to the online data services server 110 for remote processing (e.g., online processing). If, for example, the local content upload module 200 determines to transmit the content data to the online data services server 110 for remote processing, the local content upload module 200 may upload the content data to a storage location associated with the end-user (e.g., a personal storage) that is located on the online data services server 110. If, however, the local content upload module 200 determines to process the content data locally, the local content upload module 200 may initiate one or more local content analysis devices and/or one or more local content formatting devices.

The local content analysis module 204 may include software and/or hardware configured to analyze content data using one or more local content analysis devices. A local content analysis device may include software and/or hardware configured to at least analyze the content data by determining one or more characteristics of the content data. In an exemplary embodiment, a characteristic of content data may include the type of content resource that generated the content data, a title associated with the content data, a byline associated with the content data, text associated with the content data, image data associated with the content data, font preference, a date associated with the content data, a related article reference associated with the content data, one or more embedded links (e.g., Uniform Resource Locator (URL) links), a callout (e.g., factoid) associated with content data, and/or any other characteristic that may be determined to analyze the content data. In an exemplary embodiment, a characteristic of web feed content data may include a standard determined characteristic, such as, the NewsML characteristic associated with the NewsML standard.

The local content analysis module 204 may also include software and/or hardware configured to filter the content data. For example, the local content analysis module 204 may filter content data using one or more of the determined and/or analyzed characteristics of the content data.

In various embodiments, filtering content data may include determining which content data to include and/or which content data to exclude. For example, the local content analysis module 204 may filter content data that is irrelevant and/or erroneous. Irrelevant content data and/or erroneous content data may include data that should not be provided to the reader device 104 and/or data that cannot be provided to the reader device 104. For example, irrelevant content data may include data associated with content data that was screen scraped from an HTML web document, such as, bits and/or other glyphs that should not be provided to and/or displayed on the reader device 104. In another example, erroneous content data may include data (e.g., one or more characters, one or more character sequences) associated with web feed content data that is not a part of an expected character set of the web feed content data (e.g., a Cyrillic appearing on an English language newspaper page).

In various embodiments, the local content analysis module 204 may be configured to determine whether the content data is irrelevant content data and/or erroneous content data by applying one or more processing rules, such as, a content resource specific processing rule. In various embodiments, a content resource specific processing rule may include a processing rule provided by the content resource. For example, by agreement, a web feed content resource X may implement a standard character set on the web feed content data, such as the ISO-8859-1 character set. Accordingly, the web feed content resource X may provide a content resource specific processing rule that instructs the local content analysis module 204 to flag non-ISO-8859-1 characters of the web feed content data (e.g., raise an error condition) and/or remove non-ISO-8859-1 characters from the web feed content data. In another example, by agreement, a web feed content resource Y may provide and/or generate web feed content data of daily instances of Daily Column article 1 (e.g., "Hints from Heloise" article), Daily Column article 2 (e.g., "Joe Bob at the Drive In" article), and Daily Column article 3 (e.g., "Daily Horoscope" article). Accordingly, the web feed content resource Y may provide a content resource specific processing rule that instructs the local content analysis module 204 to raise an error condition if daily instances of each of the three daily columns are not included in the web feed content data.

The local content analysis module 204 may also include software and/or hardware configured to optimize one or more elements of content data. In various embodiments, one or more elements of content data may include one or more graphical elements of the content data and/or one or more textual elements of the content data. In such embodiments, the local content analysis module 204 may be configured to optimize one or more elements of content data by analyzing and processing the one or more elements for efficient and effective presentation (e.g., display) on the reader device 104. For example, the local content analysis module 204 may optimize a textual element of content data, such as, a newspaper headline, by modifying one or more typefaces associated with the newspaper headline to conform with one or more typefaces supported by the reader device 104.

The local content analysis module 204 may also include software and/or hardware configured to paginate content data using a local layout engine. A local layout engine may include software and/or hardware configured to paginate content data by organizing (e.g., laying out) text and/or images associated with content data into one or more pages based on the available page size, the margin size, and/or the font type. In such embodiments, the local layout engine may be configured to determine an ending point of content data to be displayed on a full page and a starting point of the remainder of the content data on the next empty page (e.g., attractively organizing content into other pages when one page is full).

In various embodiments, the local layout engine may be configured to access and/or create metadata associated with the content data to be used to determine how content data should be organized on a page. For example, the local layout engine may create one or more draft layouts (e.g., blueprints) of the content data using one or more font metrics and/or zoom states. A draft layout may include a virtual layout of the content data such that the text of the content data is arranged and/or organized to fold around images, links, and/or other articles of the content data in a manner that is attractive to the user. Accordingly, the local layout engine may create and/or embed metadata that indicates the locations of one or more fold points in the content data based on the one or more draft layouts.

The local content analysis module 204 may also include software and/or hardware configured to remove duplicate content data from the content data. In various embodiments, removing duplicate content data may include removing content data that is provided to the reader device 104 more than once. In various embodiments, removing duplicate content data may include applying one or more duplication rules to the content data. A duplication rule may include a rule that is used to analyze and/or determine whether content data has been provided previously using a checksum process and/or a direct comparison process that compares one or more fields of content data. For example, a duplication rule may determine that an article associated with web feed content data has been previously provided by directly comparing one or more fields of the web feed content data (e.g., title field, byline field, text field, data field) to one or more fields of previously provided content data.

The local content analysis module 204 may also include software and/or hardware configured to determine the article length of content data. In various embodiments, determining the article length of content data may include counting the amount of characters in the content data. In various embodiments, the local content analysis module 204 may be configured to filter content data based on the article length of the content data. For example, the local content analysis module 204 may determine that the article length of some content data is too short to attractively fill white space on a page. In another example, the local content analysis module 204 may determine that the article length of some other content data is too long to attractively fill white space on another page.

The local content analysis module 204 may also include software and/or hardware configured to validate content data prior to providing the content data to the reader device 104. In various embodiments, validating content data may include performing one or more validation processes on the content data, such as, an article level build validation process. An article level build validation process may execute a build process on one or more portions of the content data prior to executing a build process on the content data in its entirety. A build process may include a compiling process. Accordingly, the article level build validation process may be implemented to perform quality assurance processes and/or assist in troubleshooting processes.

For example, a publication P (e.g., content data) may include article A, article B, and article C. An article level build validation process V( ) may be configured to build article A (e.g., V(A)), build article B, (e.g., V(B)), and/or build article C (e.g., V(C)), as well as build publication P (e.g., V(P)) prior to providing the content data to the reader device 104. Accordingly, if a failure occurs on the reader device 104, one or more build processes may be used to determine the cause of the failure. Once one or more local content analysis devices have analyzed the content data, the local content analysis module 204 may allow access to the analyzed content data.

The local content format module 206 may include software and/or hardware configured to format content data using one or more local content formatting devices. A local content formatting device may include software and/or hardware configured to format the content data by converting the content data from a format decipherable by the content resource that generated the content data to a format decipherable by one or more software applications operating on the reader device 104. In an exemplary embodiment, a local content formatting device may be able to support a variety of formats, such as, HyperText Markup Language (HTML) formats (e.g., ".html" formats), Web Feed formats (e.g., ".rss" format), Adobe formats (e.g., ".pdf" formats), Microsoft Word formats (e.g., ".doc" formats), Microsoft PowerPoint formats (e.g., ".ppt" formats), Microsoft Excel formats (e.g., ".xls" formats), image formats (e.g., ".jpeg" formats, ".gif" formats, ".bmp" formats), and/or any other format produced by one or more content resources.

In an exemplary embodiment, the local content formatting device may use a converter associated with the type of content resource that generated the content data to convert the content data into a format that is decipherable by one or more software applications operating on the reader device 104. A converter may include software and/or hardware configured to transform content data into a format that is decipherable by one or more software applications operating on the reader device 104. For example, the local content formatting device may use a Web Feed converter to convert web feed content data into a format that is decipherable by one or more software applications operating on the reader device 104. In another example, the local content formatting device may use a Microsoft Word converter to convert Microsoft Word content data into a format that is decipherable by one or more software applications operating on the reader device 104. In yet another example, the local content formatting device may use a Microsoft PowerPoint converter to convert Microsoft PowerPoint content data into a format that is decipherable by one or more software applications operating on the reader device 104. In an additional example, the local content formatting device may use a HTML converter to convert HTML content data into a format that is decipherable by one or more software applications operating on the reader device 104.

The local content delivery module 202 may include software and/or hardware configured to output the formatted content data to the reader device 104 using one or more local communication mediums. In an exemplary embodiment, the local content delivery module 202 may output the formatted content data to the reader device 104 using a serial connection and/or parallel connection. For example, the local content delivery module 202 may output the formatted content data to the reader device 104 using a Universal Serial Bus (USB) port connection. In an exemplary embodiment, the local content delivery module 202 may output the formatted content data to the reader device 104 using a local area network (LAN). For example, the local content delivery module 202 may output the formatted content data to the reader device 104 using a local area network (LAN) connection, such as, Bluetooth and/or a Wi-Fi.

The communication module 208 may include software and/or hardware configured to communicate content data signals from the end-user device 102 to the data network 106. The communication module 208 may also communicate messages received from the other modules 200, 202, 204, and 206 to the data network 106, and may communicate messages to the other modules 200, 202, 204, and 206 received from the data network 106.

Figure 3:
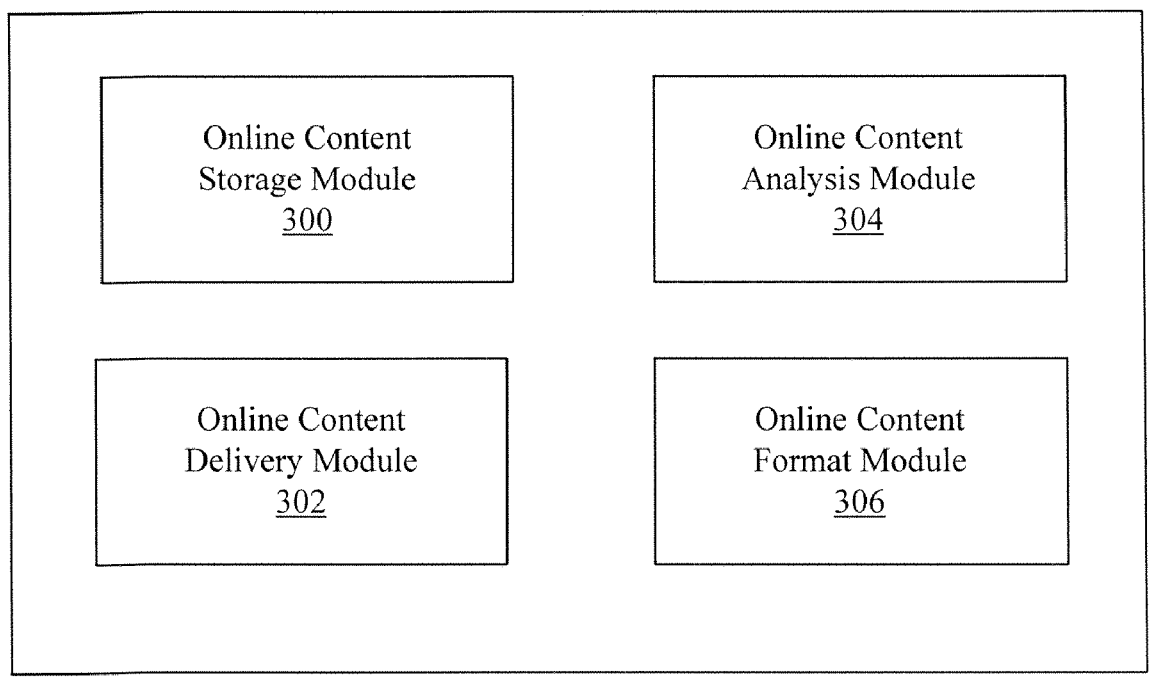
FIG. 3 illustrates exemplary modules of an online data services server in accordance with exemplary embodiments.

FIG. 3 illustrates exemplary modules of the online data services server 110 in accordance with exemplary embodiments. In an exemplary embodiment, the online data services server 110 may include an online content storage module 300, an online content delivery module 302, an online content analysis module 304, and an online content format module 306. It is noted that the modules 300, 302, 304, and 306 are exemplary. The functions of the modules 300, 302, 304, and 306 may be performed at other modules remote or local to the online data services server 110, and the modules 300, 302, 304, and 306 may be combined and/or separated.

In an exemplary embodiment, the online data services server 110 may provide one or more content data processing tools that are more sophisticated and technically robust than those operating on the end-user device 102. For example, the online data services server 110 may provide add-on features, such as: batch format conversion, additional format converters, flexible levels of encryption support for content protection, and custom tools for user management of content data. In addition, the online data services server 110 may provide support for a user to customize content distribution policies that determine how formatted content data is distributed/published to reader devices 104 external to the user's reader device.

The online content storage module 300 may include software and/or hardware configured to receive and/or store content data associated with one or more end-users. For example, the online content storage module 300 may be configured to store content data associated with a particular end-user in one or more memory locations assigned to that end-user (e.g., an online personal storage device). In an exemplary embodiment, the online personal storage may be secured using one or more security mechanisms, such as: encryption, password protection, username protection, etc. Once content data is received in an online personal storage device, the online content storage module 300 may initiate one or more online content analysis devices and/or one or more online content formatting devices.

The online content analysis module 304 may include software and/or hardware configured to analyze content data using one or more online content analysis devices. An online content analysis device may include software and/or hardware configured to at least analyze the content data by determining one or more characteristics of the content data. In an exemplary embodiment, a characteristic of content data may include the type of content resource that generated the content data, a title associated with the content data, a byline associated with the content data, text associated with the content data, image data associated with the content data, font preference, a date associated with the content data, a related article reference associated with the content data, one or more embedded links (e.g., Uniform Resource Locator (URL) links), a call out associated with content data, and/or any other characteristic that may be determined to analyze the content data. In an exemplary embodiment, a characteristic of web feed content data may include a standard determined characteristic, such as, the NewsML characteristic associated with the NewsML standard.

The online content analysis module 304 may also include software and/or hardware configured to filter the content data. For example, the online content analysis module 304 may filter content data using one or more of the determined and/or analyzed characteristics of the content data.

In various embodiments, filtering content data may include determining which content data to include and/or which content data to exclude. For example, the online content analysis module 304 may filter content data that is irrelevant and/or erroneous.

In various embodiments, the online content analysis module 304 may be configured to determine whether the content data is irrelevant content data and/or erroneous content data by applying one or more processing rules, such as, a content resource specific processing rule.

The online content analysis module 304 may also include software and/or hardware configured to optimize one or more elements of content data. In various embodiments, one or more elements of content data may include one or more graphical elements of the content data and/or one or more textual elements of the content data. In such embodiments, the online content analysis module 304 may be configured to optimize one or more elements of content data by analyzing and processing the one or more elements for efficient and effective presentation (e.g., display) on the reader device 104. For example, the online content analysis module 304 may optimize a textual element of content data, such as, a newspaper headline, by modifying one or more typefaces associated with the newspaper headline to conform with one or more typefaces supported by the reader device 104.

The online content analysis module 304 may also include software and/or hardware configured to paginate content data using an online layout engine. An online layout engine may include software and/or hardware configured to paginate content data by organizing (e.g., laying out) text and/or images associated with content data into one or more pages based on the available page size, the margin size, and/or the font type. In such embodiments, the online layout engine may be configured to determine an ending point of content data to be displayed on a full page and a starting point of the remainder of the content data on the next empty page (e.g., attractively organizing content into other pages when one page is full).

In various embodiments, the online layout engine may be configured to access and/or create metadata associated with the content data to be used to determine how content data should be organized on a page. For example, the online layout engine may create one or more draft layouts (e.g., blueprints) of the content data using one or more font metrics and/or zoom states. A draft layout may include a virtual layout of the content data such that the text of the content data is arranged and/or organized to fold around images, links, and/or other articles of the content data in a manner that is attractive to the user. Accordingly, the online layout engine may create and/or embed metadata that indicates the locations of one or more fold points in the content data based on the one or more draft layouts.

The online content analysis module 304 may also include software and/or hardware configured to remove duplicate content data from the content data. In various embodiments, removing duplicate content data may include removing content data that is provided to the reader device 104 more than once. In various embodiments, removing duplicate content data may include applying one or more duplication rules to the content data.

The online content analysis module 304 may also include software and/or hardware configured to determine the article length of content data. In various embodiments, determining the article length of content data may include counting the amount of characters in the content data. In various embodiments, the online content analysis module 304 may be configured to filter content data based on the article length of the content data. For example, the online content analysis module 304 may determine that the article length of some content data is too short to attractively fill white space on a page. In another example, the online content analysis module 304 may determine that the article length of some other content data is too long to attractively fill white space on another page.

The online content analysis module 304 may also include software and/or hardware configured to validate content data prior to providing the content data to the reader device 104. In various embodiments, validating content data may include performing one or more validation processes on the content data, such as, an article level build validation process. An article level build validation process may execute a build process on one or more portions of the content data prior to executing a build process on the content data in its entirety. A build process may include a compiling process. Accordingly, the article level build validation process may be implemented to perform quality assurance processes and/or assist in troubleshooting processes. Once one or more online content analysis devices have analyzed the content data, the online content analysis module 304 may allow access to the one or more characteristics of the content data determined.

The online content format module 306 may include software and/or hardware configured to format content data using one or more online content formatting devices. An online content formatting device may include software and/or hardware configured to format the content data by converting the content data from a format decipherable by the content resource that generated the content data to a format decipherable by one or more software applications operating on the reader device 104. In an exemplary embodiment, an online content formatting device may be able to support a variety of formats, such as, HyperText Markup Language (HTML) formats (e.g., ".html" formats), Web Feed formats (e.g., ".rss" format), Adobe formats (e.g., ".pdf" formats), Microsoft Word formats (e.g., ".doc" formats), Microsoft PowerPoint formats (e.g., ".ppt" formats), Microsoft Excel formats (e.g., ".xls" formats), image formats (e.g., ".jpeg" formats, ".gif" formats, ".bmp" formats), and/or any other format produced by one or more content resources.

In an exemplary embodiment, the online content formatting device may use a converter associated with the type of content resource that generated the content data to convert the content data into a format that is decipherable by one or more software applications operating on the reader device 104. A converter may include software and/or hardware configured to transform content data into a format that is decipherable by one or more software applications operating on the reader device 104. For example, the online content formatting device may use a Web Feed converter to convert web feed content data into a format that is decipherable by one or more software applications operating on the reader device 104. In another example, the online content formatting device may use a Microsoft Word converter to convert Microsoft Word content data into a format that is decipherable by one or more software applications operating on the reader device 104. In yet another example, the online content formatting device may use a Microsoft PowerPoint converter to convert Microsoft PowerPoint content data into a format that is decipherable by one or more software applications operating on the reader device 104. In an additional example, the online content formatting device may use a HTML converter to convert HTML content data into a format that is decipherable by one or more software applications operating on the reader device 104.

The online content delivery module 302 may include software and/or hardware configured to output the formatted content data (e.g., processed content data) to the reader device 104 using one or more online communication mediums. In an exemplary embodiment, the online content delivery module 302 may store the formatted content data in the online personal storage associated with the formatted content data. Subsequently, the formatted content data may be scheduled to be outputted to one or more reader devices 104 using the content distribution network 108. In various embodiments, scheduling may be determined by the implementers of the data services system 100 based on design preferences. For example, the formatted content data may be scheduled to be immediate output or delayed output based on the level of service available and/or the amount of bandwidth available. The level of service may include the amount of guarantee of on-time delivery. For example, based on an agreement between the user and the implementers of the data services system 100 indicating a high level of service, the online content delivery module 302 may be instructed to schedule formatted content data for immediate delivery. In another example, based on an agreement between the user and the implementers of the data services system 100 indicating a low level of service, the online content delivery module 302 may be instructed to schedule formatted content data for delayed delivery. Accordingly, the level of service may used as input to a delivery algorithm implemented by the implementers of the data services system 100.

Figure 4:
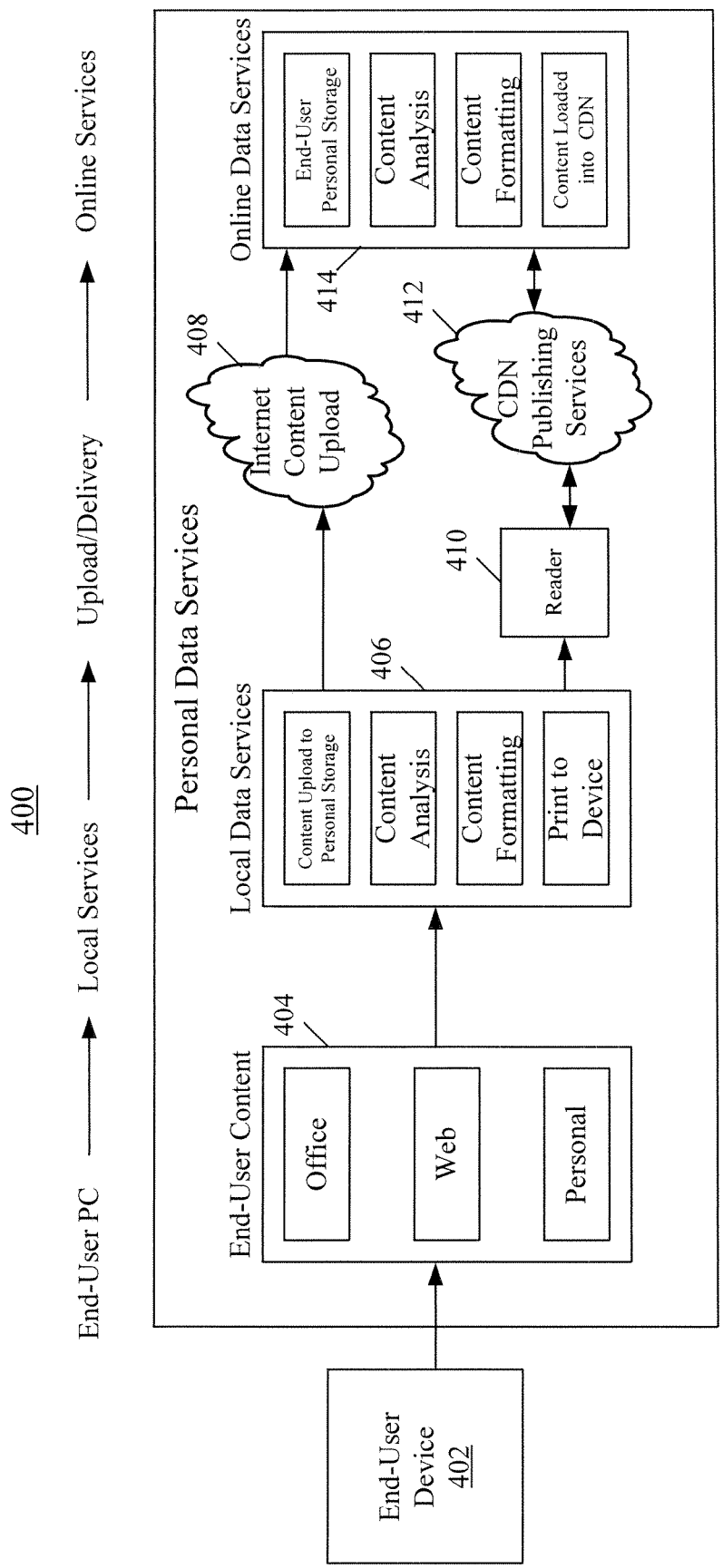
FIG. 4 illustrates a block diagram of a non-limiting example of an implementation of a data services system in accordance with exemplary embodiments.

FIG. 4 illustrates a block diagram of a non-limiting example of an implementation of a data services system 400 in accordance with exemplary embodiments. As previously discussed, one or more content resources 404 operating on and/or accessible by the end-user device 402 may generate content data that is in a format that is not decipherable by one or more software applications operating on a reader device 410.

Accordingly, the content data may processed locally on the end-user device 402 using one or more local processing devices 406 (e.g., local content analysis device, local content formatting device) or remotely on the online data services server 414 using one or more online processing devices (e.g., online content analysis device, online content formatting device). If, for example, the content data is processed locally, the formatted content data may be transmitted to the reader device 410 using one or more local communication mediums, such as, a local serial connection and/or a local area network (LAN). If, however, the content data is processed remotely, the content data may be transmitted to the online data services server 414 using a data network 108 (e.g., internet content upload network). The formatted content data on the online data services server 414 may be transmitted to the reader device 410 using a content distributed network 412 (e.g., CDN Publishing Services).

By way of a non-limiting example, for end-user content, data services may support a comprehensive set of content formats and sources. Microsoft Office documents, such as: Word or PowerPoint, Web pages, as well as other content, such as, Pictures may be processed and converted for an optimized reading experience. Local data services may be implemented as a local PC based application that integrates a set of automated content analysis and converters that are applied to the content to be processed locally. For example, if a Word document is to be converted to one of the FirstPaper formats, the document may be first loaded into a working directory where its characteristics are analyzed before a custom Word converter is applied to the document. Data services converters may support a variety of formats, such as, HTML, RSS, PDF, Office (Word, PowerPoint, Excel) as well as a number of picture specific formats, such as, JPEG, GIF, and BMP. Once conversion is completed, the new formatted document may be transferred to the reader platform using a Print Driver implementation running over the local USB connection or available local area network, such as, Wi-Fi or Bluetooth.

Instead of converting content locally, data services may offer to upload end-user documents in their native format to a secured online personal storage, one of the features of the content delivery network (e.g., content distribution network 108). The upload process may rely in this case on the ISP end-user connection. From within personal storage, data services may offer a set of more sophisticated tools and utilities for the content processing and conversion than the ones running on local PCs. Specifically, add-on features may include batch conversion, additional format converters, flexible level of encryption support for document protection, as well as custom tools for keeping track of active links within web pages and other documents. Also included may be customized level of support for content distribution policies that guide how personal documents can get published to friends, families and colleagues, e.g., through distribution to their own reader platforms, such as, e-ink devices or personal computers. Once converted, all documents may be stored in the personal storage area and may be sent to the FirstPaper content distribution network for scheduling and distribution. From dedicated business rules, scheduling may be either immediate or delayed based on level of service and available bandwidth.

Figure 5:
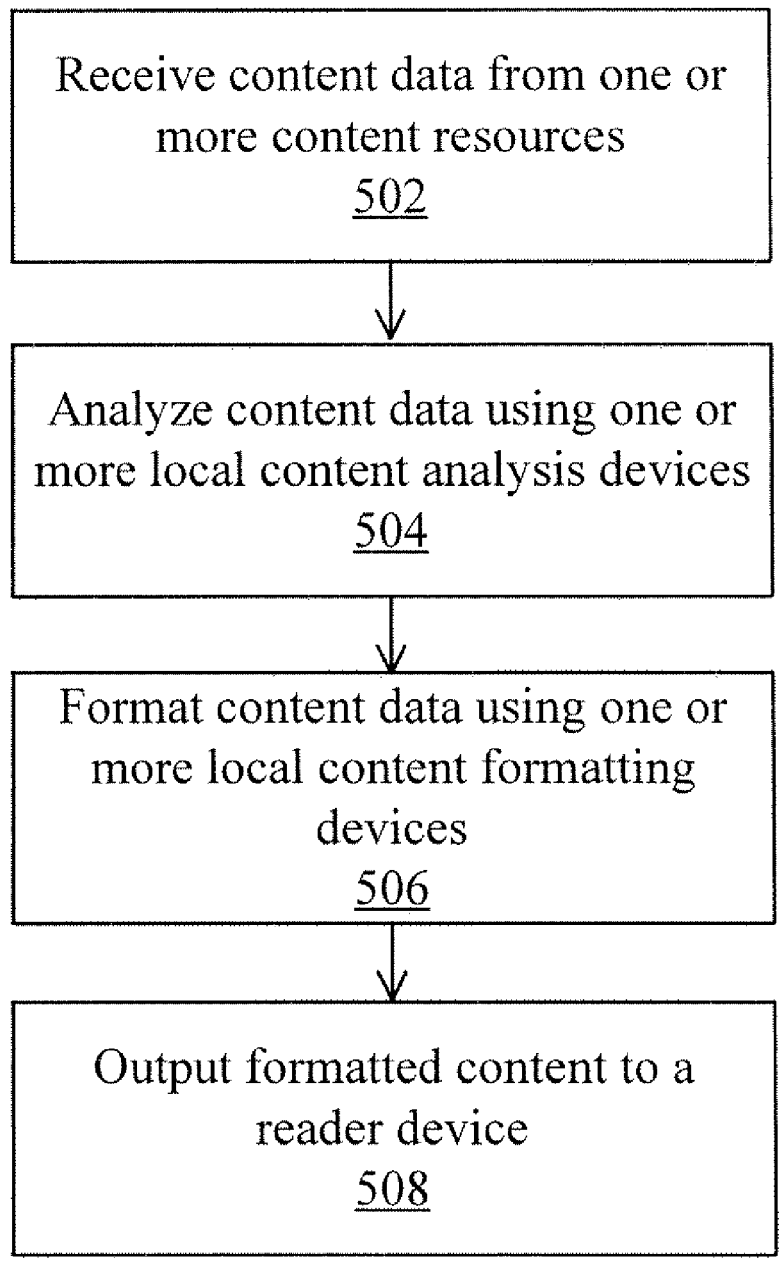
FIG. 5 illustrates a flowchart of a method for locally processing content data for one or more reader devices at a end-user device in accordance with exemplary embodiments.

FIG. 5 illustrates a flowchart of a method 500 for locally processing content data for one or more reader devices at an end-user device 102 in accordance with exemplary embodiments. This exemplary method is provided by way of example, as there are a variety of ways to carry out methods disclosed herein. The method 500 shown in FIG. 5 can be executed or otherwise performed by one or a combination of various systems. The method 500 is described below as carried out by the data services system 100 shown in FIG. 1 by way of example, and various elements of the data services system 100 are referenced in explaining the example method of FIG. 5. Each block shown in FIG. 5 represents one or more processes, methods, or subroutines carried in the exemplary method 500. Referring to FIG. 5, the exemplary method 500 may begin at block 502.

In block 502, the method 500 may include receiving content data from one or more content resources. In an exemplary embodiment, the end-user device 102 may receive content data from one or more content resources operating on and/or accessible by the end-user device 102. For example, content data may include a Microsoft Word document, a Microsoft PowerPoint presentation, a Microsoft Excel spreadsheet, a New York Time article web document, a blog posting web document, a Wall Street Journal article web document, etc. The method 500 may continue to block 504.

In block 504, the method 500 may include analyzing the content data using one or more local content analysis devices. In an exemplary embodiment, a local content analysis device may analyze the content data by at least determining one or more characteristics of the content data. In an exemplary embodiment, a characteristic of content data may include the type of content resource that generated the content data. The method 500 may continue to block 506.

In block 506, the method 500 may include formatting the content data using one or more local formatting devices. In an exemplary embodiment, the local formatting device may format the content data by converting the content data from a format decipherable by the content resource that generated the content data to a format decipherable by one or more software applications operating on the reader device 104. In an exemplary embodiment, the local content formatting device may use a converter associated with the type of content resource that generated the content data to convert the content data into a format that is decipherable by one or more software applications operating on the reader device 104. The method 500 may continue to block 508.

In block 508, the method 500 may include outputting the formatted content data to a reader device 104 using one or more local communication mediums. In an exemplary embodiment, the end-user device 102 may output the formatted content data to the reader device 104 using a serial connection and/or parallel connection. In an exemplary embodiment, the end-user device 102 may output the formatted content data to the reader device 104 using a local area network (LAN). The method 500 may then end.

Figure 6:
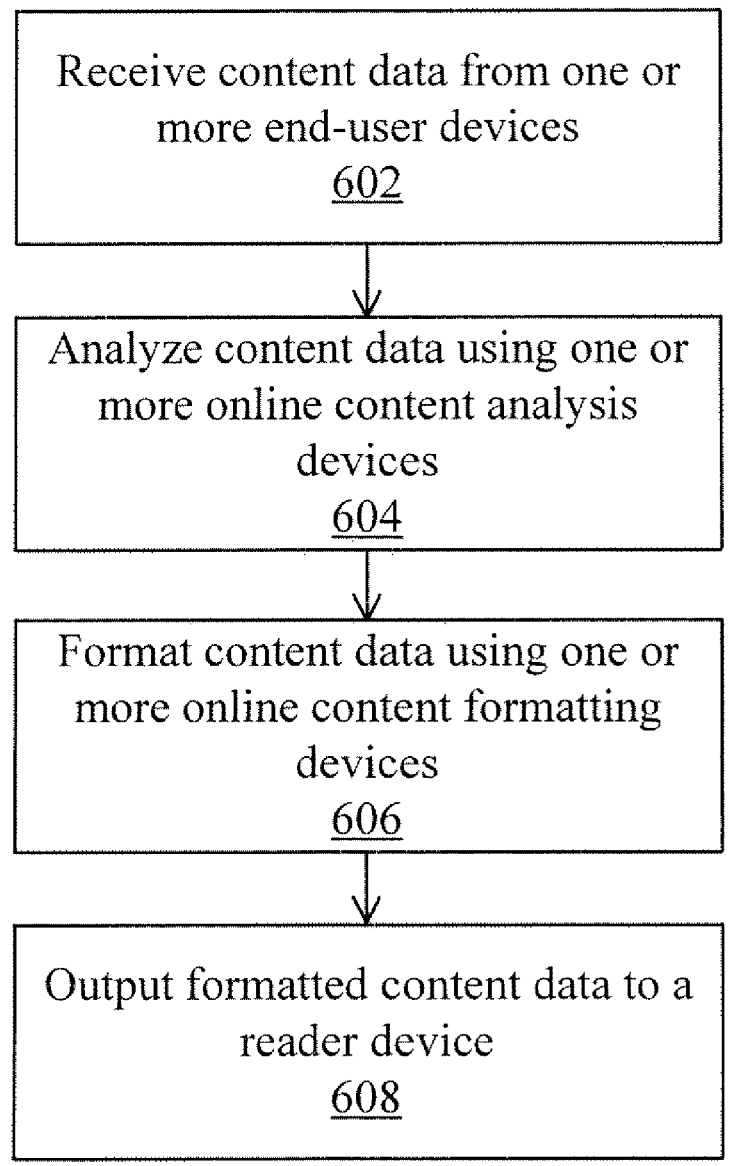
FIG. 6 illustrates a flowchart of a method for remotely processing content data for one or more reader devices at an online data service server in accordance with exemplary embodiments.

FIG. 6 illustrates a flowchart of a method 600 for remotely processing content data for one or more reader devices at an online data services server 110 in accordance with exemplary embodiments. This exemplary method is provided by way of example, as there are a variety of ways to carry out methods disclosed herein. The method 600 shown in FIG. 6 can be executed or otherwise performed by one or a combination of various systems. The method 600 is described below as carried out by the data services system 100 shown in FIG. 1 by way of example, and various elements of the data services system 100 are referenced in explaining the example method of FIG. 6. Each block shown in FIG. 6 represents one or more processes, methods, or subroutines carried in the exemplary method 600. Referring to FIG. 6, the exemplary method 600 may begin at block 602.

In block 602, the method 600 may include receiving content data from one or more end-user devices 102. In an exemplary embodiment, the end-user device 102 may transmit the content data to the online data services server 110 using the data network 108. In an exemplary embodiment, content data may include a Microsoft Word document, a Microsoft PowerPoint presentation, a Microsoft Excel spreadsheet, a New York Time article web document, a blog posting web document, a Wall Street Journal article web document, etc. The method 600 may continue to block 604.

In block 604, the method 600 may include analyzing the content data using one or more online content analysis devices. In an exemplary embodiment, an online content analysis device may analyze the content data by at least determining one or more characteristics of the content data. In an exemplary embodiment, a characteristic of content data may include the type of content resource that generated the content data. The method 600 may continue to block 606.

In block 606, the method 600 may include formatting the content data using one or more online formatting devices. In an exemplary embodiment, the online formatting device may format the content data by converting the content data from a format decipherable by the content resource that generated the content data to a format decipherable by one or more software applications operating on the reader device 104. In an exemplary embodiment, the online content formatting device may use a converter associated with the type of content resource that generated the content data to convert the content data into a format that is decipherable by one or more software applications operating on the reader device 104. The method 600 may continue to block 608.

In block 608, the method 600 may include outputting the formatted content data to a reader device 104 using one or more online communication mediums. In an exemplary embodiment, the method 600 may store the formatted content data in an online personal storage associated with the formatted content data. Subsequently, the formatted content data may be scheduled to be outputted to one or more reader devices 104 using the content distribution network 108. The method 600 may then end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method for processing content data for one or more electronic reader devices, the one or more reader devices each comprising an electronic paper display, the method comprising:
    receiving, via a first network, content data at a location remote from the one or more reader devices, the content data being supplied by an end user of the one or more reader devices, the one or more reader devices each comprising an electronic paper display, the content data being generated by a content resource, the content data being received in a first format that is Microsoft Office, DOC, HTML, HTM, JPEG, JPG, GIF, PNG, BMP, TXT, AZW, MOBI, PRC, PDF, DOCX, or RTF, and the content data being in a first format that is capable of being converted to a second format, the content data also being in the first format that is decipherable by the content resource that generated the content data;
    analyzing the content data to determine the first format of the content data, the analyzing of the content data comprising determining one or more characteristics of the content data, at least one characteristic of the content data comprising the type of content resource used to generate the content data;
    generating analysis data based on the analyzing, the analysis data comprising information related to the at least one or more characteristics of the content data, the content being analyzed remotely from the one or more reader devices;
    determining a second format that is decipherable by one or more software applications operating on the one or more reader devices;
    formatting the content data to convert the content data from the first format to the second format compatible with the one or more reader devices, whereby formatted content data is generated; and
    making the formatted content data available, via a second network, to the one or more reader devices.

2. The method of claim 1, wherein the step of making the formatted content data available further comprises transmitting the formatted content data from a personal computing device of the end user to the one or more reader devices.

3. The method of claim 1, wherein the step of making the formatted content data available comprises transmitting the formatted content data to the one or more reader devices over a USB connection.

4. The method of claim 1, further comprising:
    storing the formatted content data in an online personal storage space of an online data services server, the online personal storage space being associated with the end user of the one or more reader devices, the online personal storage space comprising one or more memory locations on the online data services server.

5. The method claim 1, wherein the receiving content data at a location remote from the one or more reader devices comprises receiving content data from a working directory of a user of the one or more reader devices.

6. The method of claim 1, wherein the making the formatted content data available comprises transmitting the formatted content data to the one or more reader devices over a local area network connection, Bluetooth connection, or Wi-Fi connection.

7. The method of claim 1, wherein the second format is TXT, AZW, MOBI, PRC, or PDF.

8. The method of claim 1, wherein the content data being formatted is non-paginated content data that is formatted using a layout engine configured to paginate the non-paginated content data.

9. The method of claim 1, wherein the content data being formatted comprises textual elements and graphical elements that are formatted using a content format module.

10. The method of claim 1, wherein the content data being formatted is included in a batch file that is converted using a batch file conversion process.

11. The method of claim 1, wherein the step of formatting the content data further comprises determining the length of the content data based on the amount of characters in the content data.

12. The method of claim 1, further comprising:
    transmitting over a communications network the formatted content data to a user of the one or more reader devices.

13. A system for processing content data for one or more electronic reader devices, the one or more reader devices each comprising an electronic paper display, the system comprising:
    a computer device comprising a computer processor configured to execute:
    a content storage module executed by the computer processor configured to receive, via a first network, content data, the content storage module being at a location remote from the one or more reader devices, the content data being supplied by an end user of the one or more reader devices, the one or more reader devices each comprising an electronic paper display, the content data being generated by a content resource, the content data being received in a first format that is Microsoft Office, DOC, HTML, HTM, JPEG, JPG, GIF, PNG, BMP, TXT, AZW, MOBI, PRC, PDF, DOCX, or RTF, and the content data being in a first format that is capable of being converted to a second format, the content data also being in the first format that is decipherable by the content resource that generated the content data;
    a content analysis module executed by the computer processor configured to analyze the content data to determine the first format of the content data, the analyzing of the content data comprising determining one or more characteristics of the content data, at least one characteristic of the content data comprising the type of content resource used to generate the content data,
    the content analysis module further configured to generate analysis data based on the analysis of the content data, the analysis data comprising information related to the one or more characteristics of the content data, the content analysis module also configured to analyze the content data remotely from the one or more reader devices;
    a content format module executed by the computer processor configured to determine a second format that is decipherable by one or more software applications operating on the one or more reader devices and to format the content data to convert the content data from the first format to the second format compatible with the one or more reader devices, whereby formatted content data is generated; and a content delivery module executed by the computer processor configured to make the formatted content data available, via a second network, to the one or more reader devices.

14. The system of claim 13, wherein the contend delivery module is further configured to transmit the formatted content data from a personal computing device of the end user to the one or more reader devices.

15. The system of claim 13, wherein the content format module is further configured to format content data that comprises textual elements and graphical elements.

16. The system of claim 13, wherein the second format is TXT, AZW, MOBI, PRC, or PDF.

* * * * *